(12) United States Patent
Moon et al.

(10) Patent No.: US 12,129,588 B2
(45) Date of Patent: Oct. 29, 2024

(54) SYSTEMS AND METHODS FOR MONITORING TURN-OVER PERFORMANCE

(71) Applicant: Haier US Appliance Solutions, Inc., Wilmington, DE (US)

(72) Inventors: Hyeonsoo Moon, Seoul (KR); Hoyoung Lee, Seoul (KR); Jeonghoon Lee, Gyeonggi-do (KR); Khalid Jamal Mashal, Louisville, KY (US); Je Kwon Yoon, Seongnam (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 342 days.

(21) Appl. No.: 17/529,632

(22) Filed: Nov. 18, 2021

(65) Prior Publication Data

US 2023/0151526 A1    May 18, 2023

(51) Int. Cl.
| | | |
|---|---|---|
| *D06F 34/14* | (2020.01) | |
| *D06F 33/36* | (2020.01) | |
| *D06F 33/38* | (2020.01) | |
| *D06F 103/02* | (2020.01) | |
| *D06F 105/10* | (2020.01) | |
| *D06F 105/46* | (2020.01) | |
| *D06F 105/52* | (2020.01) | |
| *G05B 19/04* | (2006.01) | |
| *G06V 20/00* | (2022.01) | |

(52) U.S. Cl.
CPC .............. *D06F 34/14* (2020.02); *D06F 33/36* (2020.02); *D06F 33/38* (2020.02); *G05B 19/041* (2013.01); *G06V 20/00* (2022.01); *D06F 2103/02* (2020.02); *D06F 2105/10* (2020.02); *D06F 2105/46* (2020.02); *D06F 2105/52* (2020.02); *G05B 2219/2633* (2013.01)

(58) Field of Classification Search
None
See application file for complete search history.

(56) References Cited

U.S. PATENT DOCUMENTS 8,528,229 B2    9/2013  Ashrafzadeh

FOREIGN PATENT DOCUMENTS

| CN | 109594286 A | 4/2019 |
| WO | WO2020215777 A1 | 10/2020 |
| WO | WO2021025196 A1 | 2/2021 |

*Primary Examiner* — Rita P Adhlakha
(74) *Attorney, Agent, or Firm* — Dority & Manning, P.A.

(57) ABSTRACT

A washing machine appliance includes a wash basket that is rotatably mounted within a wash tub and that defines a wash chamber for receiving a load of clothes. A camera assembly is used to monitor articles for washing within the wash basket. Specifically, a controller of the washing machine appliance uses the camera assembly to obtain a reference image and one or more test images, which utilize image recognition to assess turn-over of the articles for washing during a given wash cycle. When turn-over performance is inadequate, a controller may adjust one or more operating parameters of the wash cycle to improve performance. Turn-over performance of the wash cycle is determined to be adequate once the image recognition process fails to find adequate correlation between the reference image and the test image a predetermined number of times.

19 Claims, 7 Drawing Sheets

SYSTEMS AND METHODS FOR MONITORING TURN-OVER PERFORMANCE

FIELD OF THE INVENTION

The present subject matter relates generally to washing machine appliances, or more specifically, to systems and methods for using feature matching processes to assess turn-over performance in a top-loading washing machine appliance.

BACKGROUND OF THE INVENTION

Washing machine appliances generally include a cabinet which receives a wash tub for containing water or wash fluid (e.g., water and detergent, bleach, or other wash additives). The wash tub may be suspended within the cabinet by a suspension system to allow some movement relative to the cabinet during operation. A wash basket is rotatably mounted within the wash tub and defines a wash chamber for receipt of articles for washing. A drive assembly is coupled to the wash tub and is configured to selectively rotate the wash basket within the wash tub. In certain top load washing machines, an agitator or impeller may reside at the bottom of the wash basket to aid in movement of the articles being washed.

Wash performance is dependent, in part, on sufficient turn-over of the articles to be washed during wash (and rinse) cycles. Turn-over is a measure of the movement of such articles within the wash tub during washing. When turn-over is inadequate, the articles of wash remain relatively stagnant during the wash cycle, thus failing to expose dirt and stains on some surfaces of the articles of wash. Certain conventional washing machine appliances are tested and wash cycle setting are optimized prior to shipment of the appliances. However, such washing machine appliances lack any mechanism for determining the turn-over performance of the appliance during operation by the user. In some cases, lower water pressure at a user's home may lead to lower water levels during a wash cycle, which can negatively impact turn-over performance. In other cases, the temperature of a hot water heater may be adjusted, affecting the temperature of the water used in the washing machine appliance and the turn-over performance. In yet another case, users may employ improper wash cycles for the type of load, leading to agitation profiles that are too strong or weak, once again decreasing turn-over performance. In at least each of these cases, many conventional washing machine appliances are unable to adjust to the specific conditions during operation to optimize wash performance.

Accordingly, an apparatus and method for addressing operational turn-over performance in washing machine appliances is desirable. More specifically, a washing machine appliance that is capable assessing turn-over performance and adjusting operating parameters of the appliance during a given cycle to improve performance would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a washing machine appliance is provided including a wash tub positioned within a cabinet, a wash basket rotatably mounted within the wash tub and defining a wash chamber configured for receiving a load of clothes, a camera assembly mounted above the wash basket, and a controller operably coupled to the camera assembly. The wash basket further includes a wash basket floor. The camera assembly further has a field of view in the direction of the wash basket floor. The controller is configured to initiate a wash cycle and perform a turn-over test process. The turn-over test process includes obtaining a reference image of the load of clothes using the camera assembly and performing an image comparison process. The image comparison process includes obtaining one or more test images of the load of clothes using the camera assembly, performing a comparison of the one or more test images to the reference image, and determining if the load of clothes has turned over based on the comparison of the one or more test images to the reference image. The controller is further configured to adjust at least one operating parameter of the washing machine appliance relating to the wash cycle when it is determined that the load of clothes failed to turn-over.

In another exemplary embodiment, a method of using a camera to assess turn-over performance in a washing machine appliance is provided. The method includes initiating a wash cycle and performing a turn-over test process. The turn-over test process includes obtaining a reference image of the load of clothes using the camera and performing an image comparison process. The image comparison process includes obtaining one or more test images of the load of clothes using the camera, performing a comparison of the one or more test images to the reference image, and determining if the load of clothes has turned over based on the comparison of the one or more test images to the reference image. The method further includes adjusting at least one operating parameter of the washing machine appliance relating to the wash cycle when it is determined that the load of clothes failed to turn-over.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
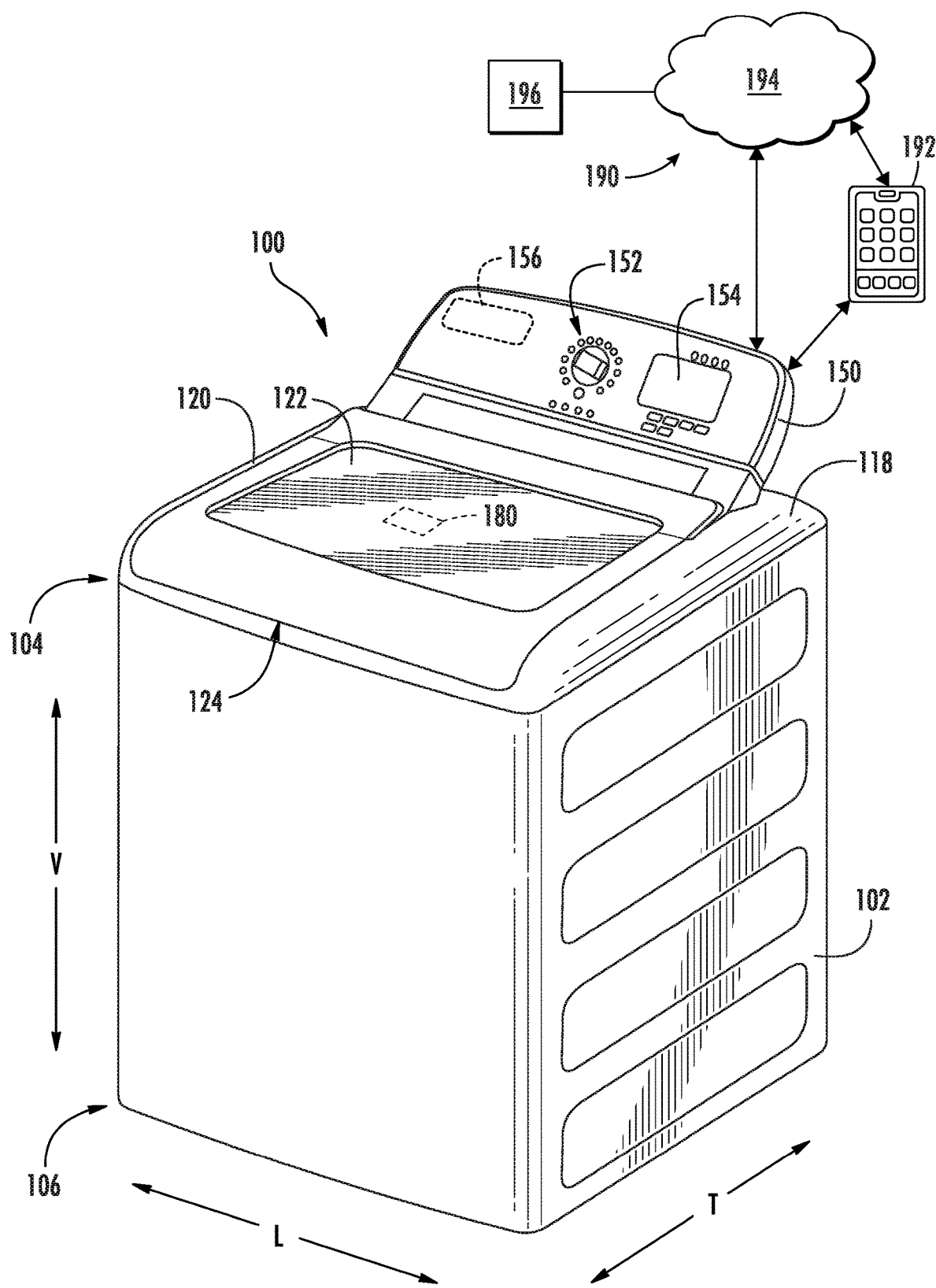
FIG. 1 provides a perspective view of a washing machine appliance according to an exemplary embodiment of the present subject matter with a door of the exemplary washing machine appliance shown in a closed position.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
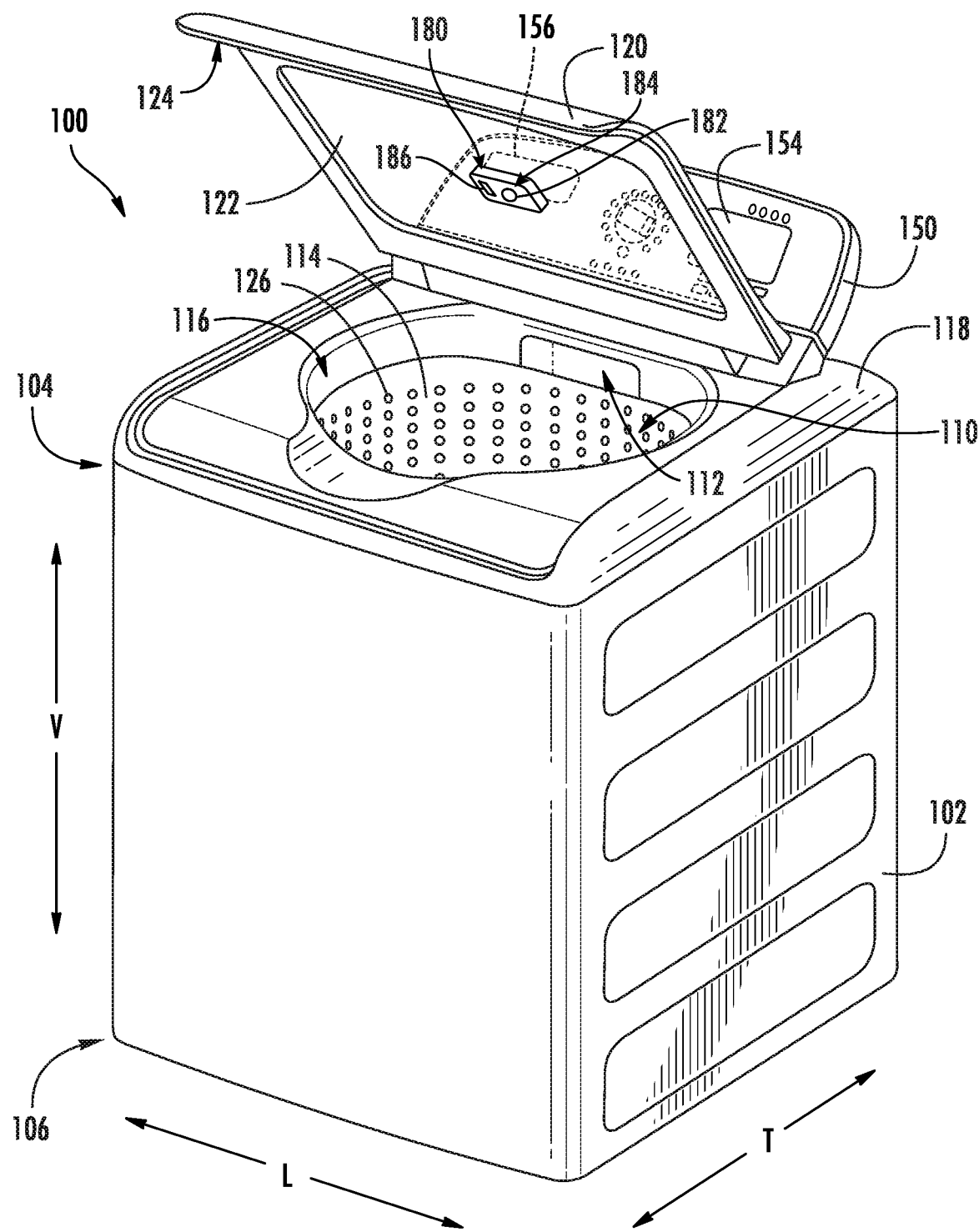
FIG. 2 provides a perspective view of the exemplary washing machine appliance of FIG. 1 with the door of the exemplary washing machine appliance shown in an open position.
Figure 3:
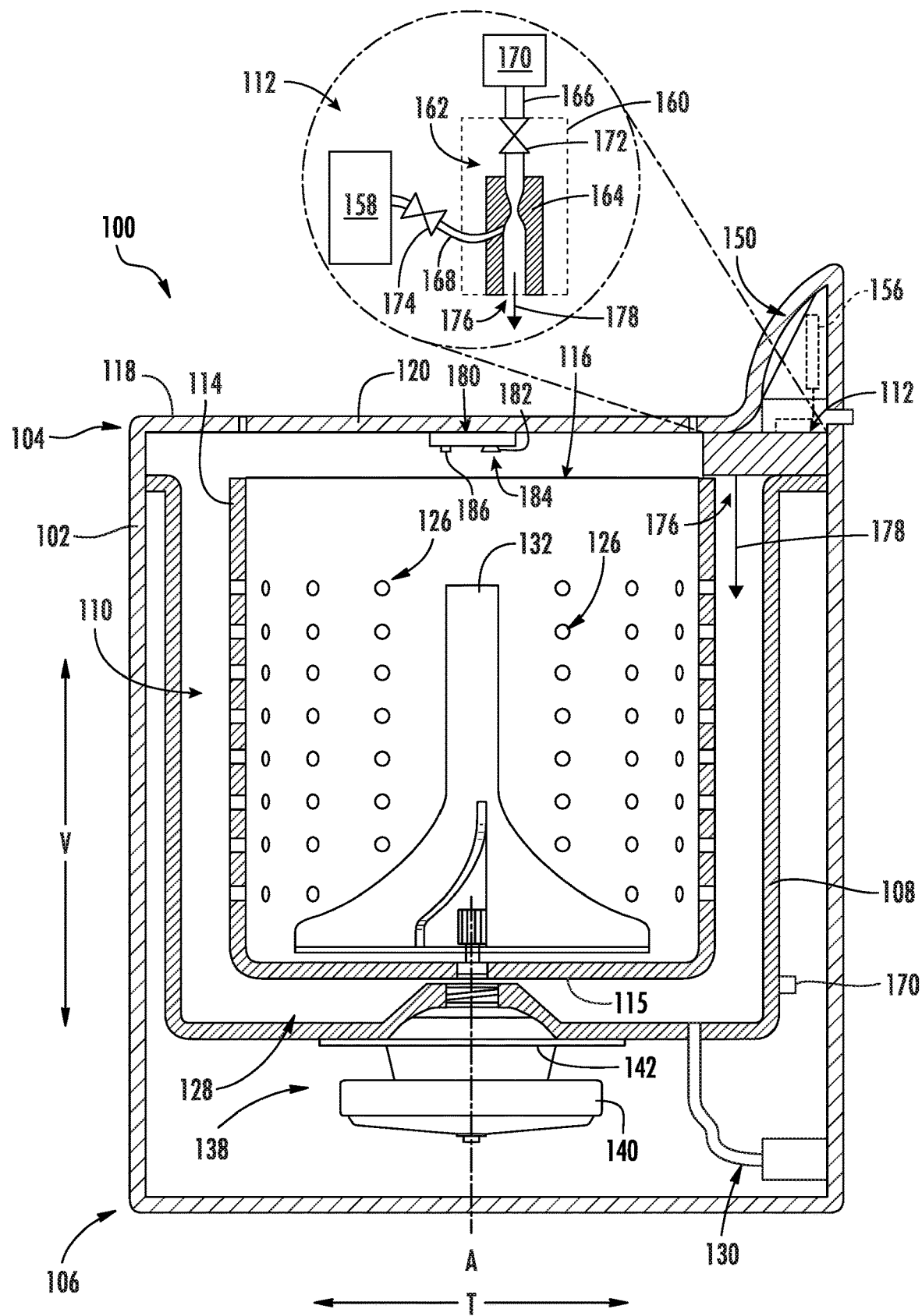
FIG. 3 provides a side cross-sectional view of the exemplary washing machine appliance of FIG. 1.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V, between a first side (left) and a second side (right) along the lateral direction L, and between a front and a rear along the transverse direction T. As best shown in FIG. 3, a wash tub 108 is positioned within cabinet 102, defines a wash chamber 110, and is generally configured for retaining wash fluids during an operating cycle. Washing machine appliance 100 further includes a primary dispenser or dispensing assembly 112 (FIG. 2) for dispensing wash fluid into wash tub 108.

In addition, washing machine appliance 100 includes a wash basket 114 that is positioned within wash tub 108 and generally defines an opening 116 for receipt of articles for washing. More specifically, wash basket 114 is rotatably mounted within wash tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100.

As illustrated, cabinet 102 of washing machine appliance 100 has a top panel 118. Top panel 118 defines an opening (FIG. 2) that coincides with opening 116 of wash basket 114 to permit a user access to wash basket 114. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 114. Conversely, in the open position, a user can access wash basket 114. A window 122 in door 120 permits viewing of wash basket 114 when door 120 is in the closed position, e.g., during operation of washing machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 114 further defines a plurality of perforations 126 to facilitate fluid communication between an interior of wash basket 114 and wash tub 108. In this regard, wash basket 114 is spaced apart from wash tub 108 to define a space for wash fluid to escape wash chamber 110. During a spin cycle, wash fluid within articles of clothing and within wash chamber 110 is urged through perforations 126 wherein it may collect in a sump 128 defined by wash tub 108. Washing machine appliance 100 further includes a pump assembly 130 (FIG. 3) that is located beneath wash tub 108 and wash basket 114 for gravity assisted flow when draining wash tub 108.

An impeller or agitation element 132 (FIG. 3), such as a vane agitator, impeller, auger, oscillatory basket mechanism, or some combination thereof is disposed in wash basket 114 to impart an oscillatory motion to articles and liquid in wash basket 114. More specifically, agitation element 132 extends into wash basket 114 and assists agitation of articles disposed within wash basket 114 during operation of washing machine appliance 100, e.g., to facilitate improved cleaning. In different embodiments, agitation element 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 132 and wash basket 114 are oriented to rotate about axis of rotation A (which is substantially parallel to vertical direction V).

As best illustrated in FIG. 3, washing machine appliance 100 includes a drive assembly or motor assembly 138 in mechanical communication with wash basket 114 to selectively rotate wash basket 114 (e.g., during an agitation or a rinse cycle of washing machine appliance 100). In addition, motor assembly 138 may also be in mechanical communication with agitation element 132. In this manner, motor assembly 138 may be configured for selectively rotating or oscillating wash basket 114 and/or agitation element 132 during various operating cycles of washing machine appliance 100.

More specifically, motor assembly 138 may generally include one or more of a drive motor 140 and a transmission assembly 142, e.g., such as a clutch assembly, for engaging and disengaging wash basket 114 and/or agitation element 132. According to the illustrated embodiment, drive motor 140 is a brushless DC electric motor, e.g., a pancake motor. However, according to alternative embodiments, drive motor 140 may be any other suitable type or configuration of motor. For example, drive motor 140 may be an AC motor, an induction motor, a permanent magnet synchronous motor, or any other suitable type of motor. In addition, motor assembly 138 may include any other suitable number, types, and configurations of support bearings or drive mechanisms.

Referring still to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation.

Operation of washing machine appliance 100 is controlled by a controller or processing device 156 that is operatively coupled to control panel 150 for user manipulation to select washing machine cycles and features. In response to user manipulation of control panel 150, controller 156 operates the various components of washing machine appliance 100 to execute selected machine cycles and features. According to an exemplary embodiment, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

During operation of washing machine appliance 100, laundry items are loaded into wash basket 114 through opening 116, and washing operation is initiated through operator manipulation of input selectors 152. Wash basket 114 is filled with water and detergent and/or other fluid additives via primary dispenser 112. One or more valves can be controlled by washing machine appliance 100 to provide for filling wash tub 108 and wash basket 114 to the appropriate level for the amount of articles being washed and/or rinsed. By way of example for a wash mode, once wash basket 114 is properly filled with fluid, the contents of wash basket 114 can be agitated (e.g., with agitation element 132 as discussed previously) for washing of laundry items in wash basket 114.

Referring again to FIGS. 2 and 3, dispensing assembly 112 may generally be configured to dispense wash fluid to facilitate one or more operating cycles or phases of an operating cycle (e.g., such as a wash cycle or a rinse cycle). The terms "wash fluid" and the like may be used herein to generally refer to a liquid used for washing and/or rinsing clothing or other articles. For example, the wash fluid is typically made up of water that may include other additives such as detergent, fabric softener, bleach, or other suitable treatments (including combinations thereof). More specifically, the wash fluid for a wash cycle may be a mixture of water, detergent, and/or other additives, while the wash fluid for a rinse cycle may be water only.

As best shown schematically in FIG. 3, dispensing assembly 112 may generally include a bulk storage tank or bulk reservoir 158 and a dispenser box 160. More specifically, bulk reservoir 158 may be positioned under top panel 118 and defines an additive reservoir for receiving and storing wash additive. More specifically, according to the illustrated embodiment, bulk reservoir 158 may contain a bulk volume of wash additive (such as detergent or other suitable wash additives) that is sufficient for a plurality of wash cycles of washing machine appliance 100, such as no less than twenty wash cycles, no less than fifty wash cycles, etc. As a particular example, bulk reservoir 158 is configured for containing no less than twenty fluid ounces, no less than three-quarters of a gallon, or about one gallon of wash additive.

Dispensing assembly 112 may include features for drawing wash additive from bulk reservoir 158 and mixing it with water prior to directing the mixture into wash tub 108 to facilitate a cleaning operation. By contrast, dispensing assembly 112 is also capable of dispensing water only. Thus, dispensing assembly 112 may automatically dispense the desired amount of water with or without a desired amount of wash additive such that a user can avoid filling dispenser box 160 with detergent before each operation of washing machine appliance 100.

For example, as best shown in FIG. 3, washing machine appliance 100 includes an aspirator assembly 162, which is a Venturi-based dispensing system that uses a flow of water to create suction within a Venturi tube to draw in wash additive from bulk reservoir 158 which mixes with the water and is dispensed into wash tub 108 as a concentrated wash fluid preferably having a target volume of wash additive. After the target volume of wash additive is dispensed into wash tub 108, additional water may be provided into wash tub 108 as needed to fill to the desired wash volume. It should be appreciated that the target volume may be pre-programmed in controller 156 according to the selected operating cycle or parameters, may be set by a user, or may be determined in any other suitable manner.

As illustrated, aspirator assembly 162 includes a Venturi pump 164 that is fluidly coupled to both a water supply conduit 166 and a suction line 168. As illustrated, water supply conduit 166 may provide fluid communication between a water supply source 170 (such as a municipal water supply) and a water inlet of Venturi pump 164. In addition, washing machine appliance 100 includes a water fill valve or water control valve 172 which is operably coupled to water supply conduit 166 and is communicatively coupled to controller 156. In this manner, controller 156 may regulate the operation of water control valve 172 to regulate the amount of water that passes through aspirator assembly 162 and into wash tub 108.

In addition, suction line 168 may provide fluid communication between bulk reservoir 158 and Venturi pump 164 (e.g., via a suction port defined on Venturi pump 164). Notably, as a flow of water is supplied through Venturi pump 164 to wash tub 108, the flowing water creates a negative pressure within suction line 168. This negative pressure may draw in wash additive from bulk reservoir 158. When certain conditions exist, the amount of wash additive dispensed is roughly proportional to the amount of time water is flowing through Venturi pump 164.

Referring still to FIG. 3, aspirator assembly 162 may further include a suction valve 174 that is operably coupled to suction line 168 to control the flow of wash additive through suction line 168 when desired. For example, suction valve 174 may be a solenoid valve that is communicatively coupled with controller 156. Controller 156 may selectively open and close suction valve 174 to allow wash additive to flow from bulk reservoir 158 through additive suction valve 174. For example, during a rinse cycle where only water is desired, suction valve 174 may be closed to prevent wash additive from being dispensed through suction valve 174. In some embodiments, suction valve 174 is selectively controlled based on at least one of the selected wash cycle, the soil level of the articles to be washed, and the article type. According to still other embodiments, no suction valve 174 is needed at all and alternative means for preventing the flow of wash additive may be used or other water regulating valves may be used to provide water into wash tub 108.

Washing machine appliance 100, or more particularly, dispensing assembly 112, generally includes a discharge nozzle 176 for directing a flow of wash fluid (e.g., identified herein generally by reference numeral 178) into wash chamber 108. In this regard, discharge nozzle 176 may be positioned above wash tub proximate a rear of opening 116 defined through top panel 118. Dispensing assembly 112 may be regulated by controller 156 to discharge wash fluid 178 through discharge nozzle 176 at the desired flow rates, volumes, and/or detergent concentrations to facilitate various operating cycles, e.g., such as wash or rinse cycles.

Although water supply conduit 166, water supply source 170, discharge nozzle 176, and water control valve 172 are all described and illustrated herein in the singular form, it should be appreciated that these terms may be used herein generally to describe a supply plumbing for providing hot and/or cold water into wash chamber 110. In this regard, water supply conduit 166 may include separate conduits for receiving hot and cold water, respectively. Similarly, water supply source 170 may include both hot- and cold-water supplies regulated by dedicated valves. In addition, washing machine appliance 100 may include one or more pressure sensors (not shown) for detecting the amount of water and or clothes within wash tub 108. For example, the pressure sensor may be operably coupled to a side of tub 108 for detecting the weight of wash tub 108, which controller 156 may use to determine a volume of water in wash chamber 110 and a washer load weight.

After wash tub 108 is filled and the agitation phase of the wash cycle is completed, wash basket 114 can be drained, e.g., by drain pump assembly 130. Laundry articles can then be rinsed by again adding fluid to wash basket 114 depending on the specifics of the cleaning cycle selected by a user. The impeller or agitation element 132 may again provide agitation within wash basket 114. One or more spin cycles may also be used as part of the cleaning process. In particular, a spin cycle may be applied after the wash cycle and/or after the rinse cycle in order to wring wash fluid from the articles being washed. During a spin cycle, wash basket 114 is rotated at relatively high speeds to help wring fluid from the laundry articles through perforations 126. During or prior to the spin cycle, drain pump assembly 138 may operate to discharge wash fluid from wash tub 108, e.g., to an external drain. After articles disposed in wash basket 114 are cleaned and/or washed, the user can remove the articles from wash basket 114, e.g., by reaching into wash basket 114 through opening 116.

Referring now specifically to FIGS. 2 and 3, washing machine appliance 100 may further include a camera assembly 180 that is generally positioned and configured for obtaining images within wash chamber 110 of washing machine appliance 100. Specifically, according to the illustrated embodiment, camera assembly 180 may include a camera 182 mounted to an underside of door 120 of washing machine appliance 100. In this manner, when door 120 is in the closed position, camera 182 may be positioned over wash chamber 110 and may be oriented for obtaining images within wash chamber 110. In alternative embodiments, camera 182 need not be mounted to door 120, but may instead be mounted above wash basket 114 such that it has a field of view of wash basket floor 115 or the load of clothes or other articles therein. In this manner, camera 182 can take unobstructed images or video of an inside of wash chamber 110, e.g., including images of wash basket 114 and articles for washing therein.

It should be appreciated that camera assembly 180 may include any suitable number, type, size, and configuration of camera(s) 182 for obtaining images of wash chamber 110. In general, cameras 182 may include a lens 184 that is constructed from a clear hydrophobic material or which may otherwise be positioned behind a hydrophobic clear lens. So positioned, camera assembly 180 may obtain one or more images or videos within wash chamber 110, as described in more detail below.

Referring still to FIGS. 2 through 3, washing machine appliance 100 may further include a tub light 186 that is positioned within cabinet 102 or wash chamber 110 for selectively illuminating wash chamber 110 and the load of clothes positioned therein. Specifically, as shown in FIG. 2, tub light 186 may be integrated into camera assembly 180 and may be positioned immediately adjacent camera 182. According to still other embodiments, tub light 186 may be positioned at any other suitable location within cabinet 102. It should be appreciated that according to alternative embodiments, washing machine appliance 100 may include any other camera or system of imaging devices for obtaining images of the load of clothes. In addition, these cameras may be positioned at any suitable location within cabinet 102, may include any suitable lighting features, and may utilize any suitable photography or imaging technology.

Notably, controller 156 of washing machine appliance 100 (or any other suitable dedicated controller) may be communicatively coupled to camera assembly 180, tub light 186, and other components of washing machine appliance 100. As explained in more detail below, controller 156 may be programmed or configured for analyzing the images obtained by camera assembly 180, e.g., in order to determine turn-over performance, and may use this information to make informed decisions regarding the operation of washing machine appliance 100.

Referring still to FIG. 1, a schematic diagram of an external communication system 190 will be described according to an exemplary embodiment of the present subject matter. In general, external communication system 190 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 190 may be used to transfer data or other information to improve performance of one or more external devices or appliances and/or improve user interaction with such devices.

For example, external communication system 190 permits controller 156 of washing machine appliance 100 to communicate with a separate device external to washing machine appliance 100, referred to generally herein as an external device 192. As described in more detail below, these communications may be facilitated using a wired or wireless connection, such as via a network 194. In general, external device 192 may be any suitable device separate from washing machine appliance 100 that is configured to provide and/or receive communications, information, data, or commands from a user. In this regard, external device 192 may be, for example, a personal phone, a smartphone, a tablet, a laptop or personal computer, a wearable device, a smart home system, or another mobile or remote device.

In addition, a remote server 196 may be in communication with washing machine appliance 100 and/or external device 192 through network 194. In this regard, for example, remote server 196 may be a cloud-based server 196, and is thus located at a distant location, such as in a separate state, country, etc. According to an exemplary embodiment, external device 192 may communicate with a remote server 196 over network 194, such as the Internet, to transmit/receive data or information, provide user inputs, receive user notifications or instructions, interact with or control washing machine appliance 100, etc. In addition, external device 192 and remote server 196 may communicate with washing machine appliance 100 to communicate similar information.

In general, communication between washing machine appliance 100, external device 192, remote server 196, and/or other user devices or appliances may be carried using any type of wired or wireless connection and using any suitable type of communication network, non-limiting examples of which are provided below. For example, external device 192 may be in direct or indirect communication with washing machine appliance 100 through any suitable wired or wireless communication connections or interfaces, such as network 194. For example, network 194 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 190 is described herein according to an exemplary embodiment of the present subject matter. However, it should be appreciated that the exemplary functions and configurations of external communication system 190 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well. In addition, aspects of the present subject matter may be utilized in a combination washer/dryer appliance.

Now that the construction of washing machine appliance 100 and the configuration of controller 156 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as horizontal axis washing machine appliances. In exemplary embodiments, the various method steps as disclosed herein may be performed by controller 156 or a separate, dedicated controller.

Figure 4:
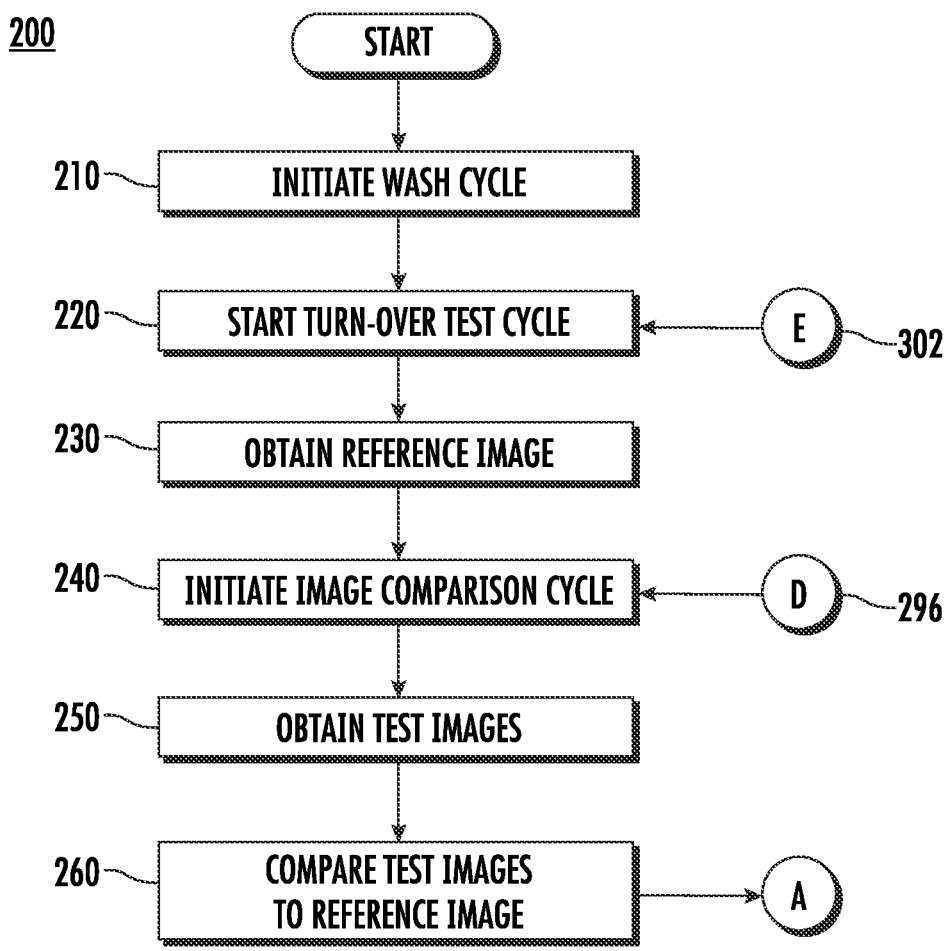
FIG. 4 provides a flow diagram of a portion of a method of using a camera to assess turn-over performance in accordance with one embodiment of the present disclosure.

Referring now to FIG. 4, method 200 includes, at step 210 a wash cycle is initiated. Initiation of a wash cycle generally involves the identification of a variety of wash parameters based on the type of wash cycle desired. For example, the load size for a given wash may be associated with a predetermined targeted water level within the wash tub. In another example, the agitation profile, which may depend upon the wash cycle type (e.g., delicates, heavy-duty), may be associated with a predetermined intensity of movement targeted by the agitation element or impeller, such as, for example, the agitator ramp up speed or the length of time the agitator is activated. In still other examples, the temperature setting of the washing machine appliance may be associated with a given water temperature to be used with each particular setting. At step 210, a wash cycle may be initiated employing the predetermined parameters associated with the various settings for the particular cycle. In alternative embodiments employing artificial intelligence, as further described herein, these parameters may differ from the predetermined parameters based adjustments made as the washing machine appliance learns optimal settings.

At step 220 of method 200, a turn-over test process is performed. The turn-over test process is intended to assess turn-over performance of the washing machine appliance during a wash cycle. The turn-over test process may be run iteratively, as further described herein. The turn-over test process initially obtains a reference image at step 230. The reference image is taken using a camera with a field of view in the direction of the wash basket floor. As the reference image is generally taken during a wash cycle (or during a rinse cycle, as further discussed herein), articles for washing are typically present in the wash basket and thus within the field of view of the camera. As a result, the reference image captures the state of the articles for washing at a given point in time. It may be desirable to obtain the reference image prior to the initiation of movement by the agitator, impeller, or wash basket to minimize blurring of the acquired reference image.

Method 200 may further include, at step 240, initiating performance of an image comparison process. The image comparison process assesses movement of the articles for washing within the wash basket over time by comparing the reference image to subsequent images, as herein described. The image comparison process may be nested within the turn-over test process and, like the turn-over test process, may be performed iteratively, for example, to assess movement of the articles of wash over differing time periods.

Specifically, at step 250 of method 200, one or more test images may be obtained using the camera. The one or more test images may be a taken during the wash cycle at any time after obtaining the reference image. Because different wash cycles have varying parameters, including wash time, there is no required time frame within which the one or more test images must be taken after acquisition of the reference image. Rather, the time difference between test and reference images may vary depending, for example, on the length of the wash cycle and the desired turn-over rate. However, it is generally desirable to acquire the test images well in advance of the end of the wash cycle to enable parameters of the wash cycle to be adjusted if necessary, as further described herein. In the preferred embodiment, test images are acquired and assessed according to method 200 every minute. In alternative embodiments, test images may be acquired and assessed every five minutes. In still other embodiments, the acquisition and assessment of reference and test images may be continuous throughout the wash cycle.

Additionally, it may be desirable to obtain numerous test images at step 250. Because test images are acquired during operation of the wash cycle, it is likely that some such images would be taken while the articles for washing are in motion as a result of rotation of the wash basket or movement of the agitator, impeller, or the like. This may result in some images being blurry or otherwise unusable for subsequent steps (e.g., comparison of test and reference images, as described herein). By acquiring multiple images, in a brief period of time (e.g., 5 seconds), unusable images may be excluded while still permitting assessment of turn-over performance.

The process of obtaining the reference image and test images at steps 230 and 250 may further include activating a light source in advance of, or simultaneous with, use of the camera to obtain the images. For example, in some embodiments, a tub light may be activated to illuminate the wash chamber and thereby facilitate capturing of a useable image. In other embodiments, the camera assembly may itself include a light source for illuminating the wash chamber. In still other embodiments, the washing machine appliance may further include a light sensing device that assesses the light intensity in the wash chamber prior to obtaining images and illuminates the wash chamber (e.g., via the tub light or light source on the camera assembly) only if inadequate light is available.

Figure 5:
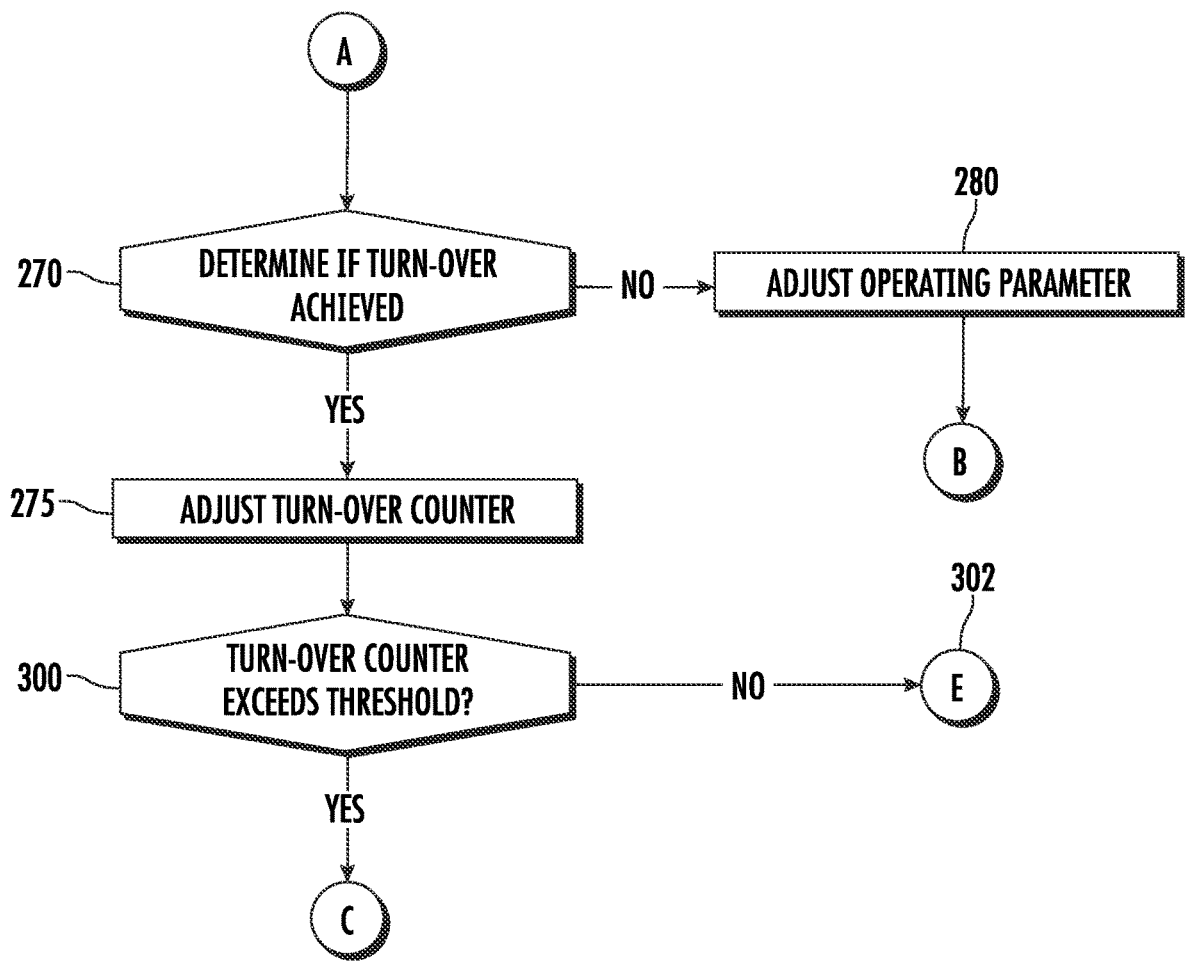
FIG. 5 provides a flow diagram of a portion of the method illustrated in FIG. 4 pertaining to assessing turn-over performance and outcomes resulting from that assessment in accordance with one embodiment of the present disclosure.

Referring still to FIG. 4, method 200 may perform a comparison of the one or more test images to the reference image at step 260 as part of the image comparison process. As shown in FIG. 5, based on the comparison of the one or more test images to the reference image, method 200 may determine if the articles for washing have turned over at step 270. Determining if articles for washing have turned over is accomplished through use of image recognition techniques. Specifically, in the preferred embodiment, feature matching techniques may be employed to assess similarities or differences between the reference image and the test images. Feature matching identifies regions of interest (e.g., shapes, shading, contrast) in the reference image and seeks to locate the corresponding regions of interest in the test images. As applied in this context, successful feature matching between the reference and test images indicates a lack of movement of the articles of wash and is a negative indicator of turn-over performance over significant time frames (e.g., over the course of half to full wash cycle lengths). In contrast, failure of feature matching between reference and test image is indicative that articles of wash have rotated within the wash basket, indicating successful turn-over performance.

The process of determining whether turn-over is successful at step 270 may be made based comparison of the reference image to each test image individually or to an approximation of a set of images. That is, where multiple test images are taken in a short time frame (e.g., each frame captured for one minute at 30 frames per second), the test images may be averaged or otherwise combined in an approximation of the image set (with or without filtering out blurred images). The reference image may thereafter be compared to the approximation of the image set for the purposes of determining turn-over performance. In alternative embodiments, the reference image may be compared to each test image acquired in a short period of time individually and the determination of turn-over performance may be based on an averaging comparison results. In still other embodiments, only a single test image may be acquired and the determination of turn-over performance may be based solely on the comparison of the reference image and the single test image.

In the preferred embodiment, the image recognition process employs artificial intelligence using a deep learning technique, as known to those skilled in the art. As used herein, the terms image recognition process and similar terms may be used generally to refer to any suitable method of observation, analysis, image decomposition, feature extraction, image classification, etc. of one or more images or videos taken within a washing machine appliance. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 180 and controller 156 may be programmed to perform such processes and take corrective action.

According to an exemplary embodiment, controller may implement a form of image recognition called region based convolutional neural network ("R-CNN") image recognition. Generally speaking, R-CNN may include taking an input image and extracting region proposals that include a potential object, such as a particular region containing wash fluid having bubbles or haziness within the wash fluid. In this regard, a "region proposal" may be regions in an image that could belong to a particular object, such as folds in a sweatshirt. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 270 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to analyze the image to locate matching features between the reference and test images. In addition, a K-means algorithm may be used. Other image recognition processes are possible and within the scope of the present subject matter.

It should be appreciated that any other suitable image recognition process may be used while remaining within the scope of the present subject matter. For example, step 270 may include using a deep belief network ("DBN") image recognition process. A DBN image recognition process may generally include stacking many individual unsupervised networks that use each network's hidden layer as the input for the next layer. According to still other embodiments, step 270 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

Additionally, or alternatively, the determination of turn-over performance at step 270 may not employ artificial intelligence at all. Rather, in some embodiments, the determination of turn-over performance based on the comparison of the reference and test images may employ strictly rule-based feature matching, having predetermined metrics (e.g., identification of a particular shape in the test image within 100 pixels of the shape's location in the reference image). Such techniques, as understood by one skilled in the art, are also intended to fall within the scope of the present subject matter.

Figure 6:
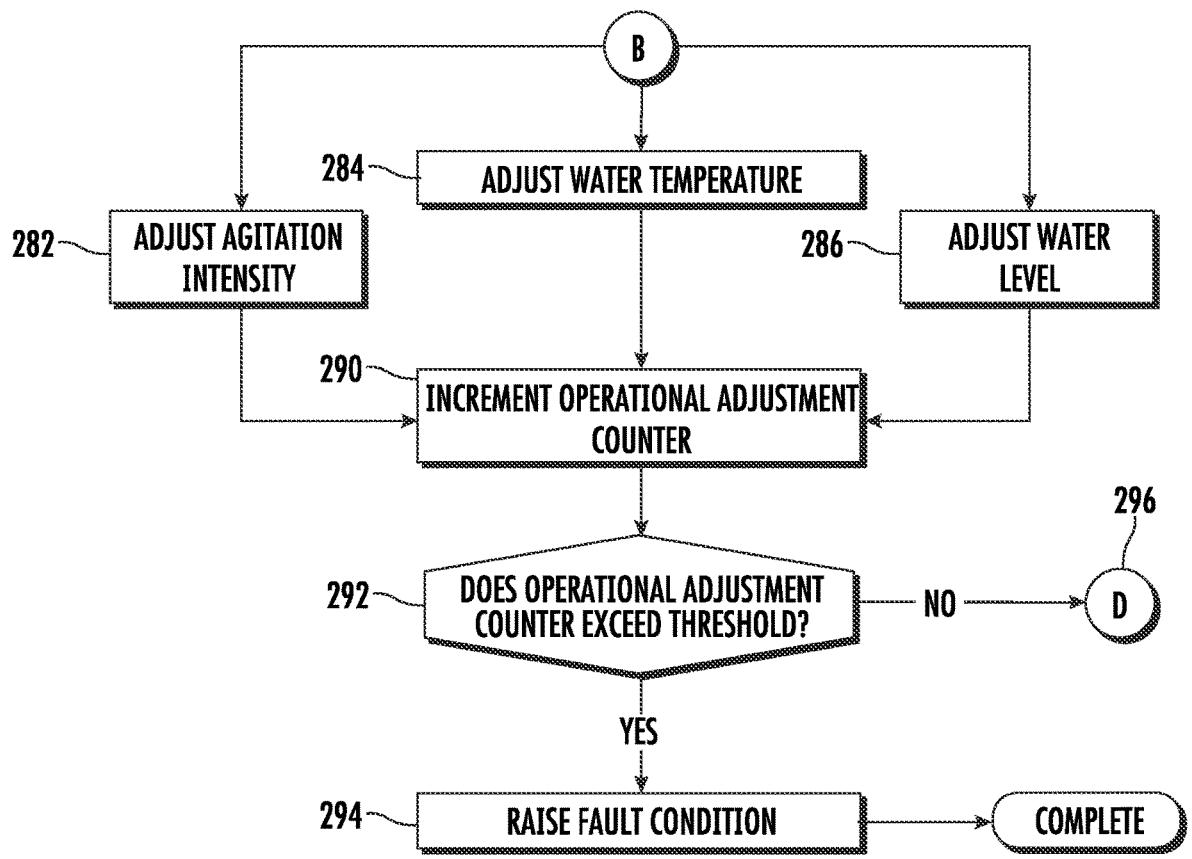
FIG. 6 provides a flow diagram of a portion of the method illustrated in FIG. 4 pertaining to adjustment of one or more operating parameters of a wash cycle in accordance with one embodiment of the present disclosure.

Referring still to FIG. 5, if it is determined that the articles of wash failed to turn-over at step 280 (i.e., feature matching identified matches between the reference and test images above a predetermined threshold, e.g., matching 50% or more of the regions of interest), at least one operating parameter of the washing machine appliance may be adjusted to address the lack of turn-over. The at least one operating parameter adjusted may relate to the current wash cycle. For example, method 200 may include adjusting the agitation intensity by adjusting the agitation profile, of the wash cycle at step 282, as shown in FIG. 6, thereby encouraging greater movement within the wash chamber. This adjustment in the agitation profile may includes, for example, adjusting the agitator ramp up speed or the length of time the agitator is activated. Additionally, or alternatively, method 200 may include adjusting the water temperature at step 284. In still another embodiment, method 200 may include adjusting the water level within the wash chamber at step 286. Other adjustments related to the operation of the washing machine appliance in a given cycle will be apparent to the skilled artisan. Further, such adjustments need not be in isolation, but may be employed in combination with each other. Additionally, or alternatively, adjustment to these operating parameters may be made sequentially in the event that multiple failures to turn-over are detected in a given wash cycle.

In cooperation with adjustment of at least one operating parameter, method 200 further includes incrementing an operational adjustment counter at step 290. The operational adjustment counter maintains in memory a count of the number of times that the wash cycle parameters have been adjusted in a given cycle in response to the determination that the articles for washing failed to turn-over. Method 200 includes checking the operational adjustment counter each time an adjustment is made and determining when the operational adjustment counter exceeds a predetermined threshold, such as number of adjustments over a given period of time (e.g., three adjustments over the past three minutes), at step 292. When the operational adjustment counter exceeds the predetermined threshold, this indicates that the adjustments made have failed to improve turn-over performance and a fault condition is raised at step 294. In such circumstances, a problem may exist with the agitator or impeller, the water supply valve, the water pressure, or other aspect of the washing machine appliance requiring a service call. This occurrence would terminate method 200.

Alternatively, if the operational adjustment counter does not exceed the predetermined threshold at step 292, further observation of the wash cycle in response to the operational adjustment is required. Accordingly, at step 296, a new image comparison process may be initiated, thus repeating method 200 beginning at step 240.

Returning to FIG. 5, in the event that it is determined that turn-over of the articles for washing has been successfully achieved at step 270 (i.e., feature matching identified matches between the reference and test images below a predetermined threshold, e.g., matching 50% or less of the regions of interest), then method 200 may include adjusting a turn-over counter value at step 275. The turn-over counter stores in memory the number of times that turn-over has been successfully detected in a given wash cycle. At step 300, method 200 may include determining whether the turn-over counter value exceeds a pre-determined threshold, such as the turn-over count in a given period of time. This threshold may be as low as one during an entire wash cycle in certain embodiments. In alternative embodiments, where greater turn-over performance is required, the predetermined threshold may be higher (e.g., turn-over counter value of six in a single wash cycle or six in six minutes). If the turn-over counter value is determined to be below the predetermined threshold, further analysis of the turn-over performance is required. Thus, at step 302, method 200 is repeated beginning with the turn-over test process at step 220.

Figure 7:
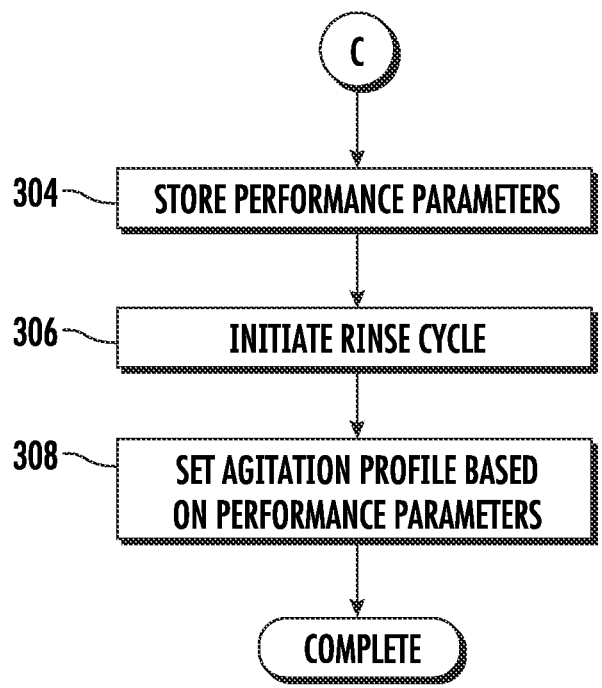
FIG. 7 provides a flow diagram of a portion of the method illustrated in FIG. 4 pertaining to adjusting performance parameters for a rinse cycle according to an exemplary embodiment of the present subject matter.

If the turnover-counter value is determined to be above the predetermined threshold at step 300, then turn-over performance for the given wash cycle is established as satisfactory and method 200 may proceed to step 304 (FIG. 7). At step 304, method 200 may include storing in memory one or more performance parameters of the wash cycle. The performance parameters may include, for example, the agitation profile, the water level, the water temperature, and the like used in the wash cycle for which adequate turn-over performance has been established. Thereafter, method 200 may include the initiation of a rinse cycle at step 306. Because the performance parameters used in the wash cycle will have already been determined to provide adequate turn-over performance for the given load size, content type, and the like, it may be assumed that the same performance parameters will also provide adequate turn-over performance in a rinse cycle for the same articles for washing. Thus, at step 308, method 200 may include setting an agitation profile for the rinse cycle based on the stored one or more performance parameters. While adequate turn-over performance may be assumed in some embodiments, in alternative embodiments, a new turn-over test process may be initiated, as set forth at step 220, and turn-over performance may be independently assessed for the rinse cycle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
   a wash tub positioned within a cabinet and containing water having a water temperature and a water height within the wash tub;
   a wash basket rotatably mounted within the wash tub for agitating clothes therein at an agitation intensity for a duration at a ramp up speed and defining a wash chamber configured for receiving a load of clothes, the wash basket further including a wash basket floor;
   a camera assembly mounted above the wash basket and having a field of view in the direction of the wash basket floor
   a controller operably coupled to the camera assembly, the controller being configured to:
   initiate a wash cycle;
   perform a turn-over test process, wherein the turn-over test process includes
   obtaining a reference image of the load of clothes using the camera assembly;
   performing an image comparison process, wherein the image comparison process includes
   obtaining one or more test images of the load of clothes using the camera assembly;
   performing a comparison of the one or more test images to the reference image;
   determining if the load of clothes has turned over based on the comparison of the one or more test images to the reference image;
   adjust at least one operating parameter of the washing machine appliance relating to the wash cycle when it is determined that the load of clothes failed to turn-over and wherein the at least one operating parameter of the washing machine appliance includes one of adjusting the agitation intensity, duration, or ramp up speed of the wash basket, adjusting the water temperature in the wash tub, or adjusting the water level in the wash tub;
   increment a turn-over counter value when it is determined that the load of clothes succeeded in turning over;
   determine whether the turn-over counter value exceeds a predetermined turn-over threshold; and
   initiate a rinse cycle when the turn-over counter value exceeds the predetermined turn-over threshold and repeat the turn-over test process when the turn-over counter value does not exceed the predetermined turn-over threshold.

2. The washing machine appliance of claim 1, wherein the controller is further configured to increment an operational adjustment counter each time that the washing machine appliance adjusts at least one operating parameter in response to the determination that the load of clothes failed to turn-over and to raise a fault condition when the operational adjustment counter exceeds a predetermined adjustment threshold.

3. The washing machine appliance of claim 2, wherein the controller is further configured to repeat the image comparison process when the operational adjustment counter does not exceed the predetermined adjustment threshold.

4. The washing machine appliance of claim 1, wherein the controller is further configured to store one or more performance parameters of the wash cycle when it is determined that the turn-over counter exceeds the predetermined turn-over threshold.

5. The washing machine appliance of claim 4, wherein the controller is further configured to set one or more of the agitation intensity, duration, or ramp up speed of the wash basket, the water temperature in the wash tub, or the water level in the wash tub for the rinse cycle based on the stored performance parameters of the wash cycle.

6. The washing machine appliance of claim 1, wherein adjusting at least one operating parameter includes adjusting the agitation profile of the wash cycle.

7. The washing machine appliance of claim 1, wherein adjusting at least one operating parameter includes adjusting the water temperature of the wash cycle.

8. The washing machine appliance of claim 1, wherein adjusting at least one operating parameter includes adjusting the water level of the wash cycle.

9. The washing machine appliance of claim 1, wherein determining if the load of clothes has turned over based on the comparison of the one or more test images to the reference image further includes applying feature matching to identify common features between the one or more test images and the reference image.

10. The washing machine appliance of claim 9, wherein applying feature matching further includes identifying common features using artificial intelligence.

11. The washing machine appliance of claim 10, wherein using artificial intelligence further comprises at least one of a convolution neural network ("CNN"), a region-based convolution neural network ("R-CNN"), a deep belief network ("DBN"), or a deep neural network ("DNN") image recognition process.

12. A method of using a camera to assess turn-over performance in a washing machine appliance comprising a cabinet, a wash tub within the cabinet containing water having a water temperature and a water height within the wash tub, and a wash basket rotatably mounted within the wash basket for agitating clothes therein at an agitation intensity for a duration at a ramp up speed, and defining a wash chamber, the method comprising:
   initiating a wash cycle;
   performing a turn-over test process, wherein the turn-over test process includes
      obtaining a reference image of the load of clothes using the camera;
      performing an image comparison process, wherein the image comparison process includes
         obtaining one or more test images of the load of clothes using the camera;
         performing a comparison of the one or more test images to the reference image;
         determining if the load of clothes has turned over based on the comparison of the one or more test images to the reference image;
      adjusting at least one operating parameter of the washing machine appliance relating to the wash cycle when it is determined that the load of clothes failed to turn-over, wherein the at least one operating parameter of the washing machine appliance includes one of adjusting the agitation intensity, duration, or ramp up speed of the wash basket, adjusting the water temperature in the wash tub, or adjusting the water level in the wash tub;
      incrementing a turn-over counter value when it is determined that the load of clothes succeeded in turning over;
      determining whether the turn-over counter value exceeds a predetermined turn-over threshold; and
      initiating a rinse cycle when the turn-over counter value exceeds the predetermined turn-over threshold and repeating the turn-over test process when the turn-over counter value does not exceed the predetermined turn-over threshold.

13. The method of claim 12, wherein the method further comprises incrementing an operational adjustment counter each time that the washing machine appliance adjusts at least one operating parameter in response to the determination that the load of clothes failed to turn-over and raising a fault condition when the operational adjustment counter exceeds a predetermined adjustment threshold.

14. The method of claim 13, wherein the method further comprises repeating the image comparison process when the operational adjustment counter does not exceed the predetermined adjustment threshold.

15. The method of claim 12, wherein the method further comprises storing one or more performance parameters of the wash cycle when it is determined that the turn-over counter exceeds the predetermined turn-over threshold.

16. The method of claim 15, wherein initiating the rinse cycle further comprises setting one or more of the agitation intensity, duration, or ramp up speed of the wash basket, the water temperature in the wash tub, or the water level in the wash tub for the rinse cycle based on the stored performance parameters of the wash cycle.

17. The method of claim 12, wherein determining if the load of clothes has turned over based on the comparison of the one or more test images to the reference image further includes applying feature matching to identify common features between the one or more test images and the reference image.

18. The method of claim 17, wherein applying feature matching further includes identifying common features using artificial intelligence, including at least one of a convolution neural network ("CNN"), a region-based convolution neural network ("R-CNN"), a deep belief network ("DBN"), or a deep neural network ("DNN") image recognition process.

19. The method of claim 12, wherein the wash basket further includes an agitator and adjusting the agitation intensity, duration, or ramp up speed of the wash basket comprises adjusting the agitation intensity, duration, or ramp up speed of the agitator.

* * * * *